US012728641B2

(12) United States Patent
Otana

(10) Patent No.: US 12,728,641 B2
(45) Date of Patent: Sep. 8, 2026

(54) INKJET RECORDING APPARATUS

(71) Applicant: KYOCERA Document Solutions Inc., Osaka (JP)

(72) Inventor: Aiichiro Otana, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 125 days.

(21) Appl. No.: 18/767,457

(22) Filed: Jul. 9, 2024

(65) Prior Publication Data

US 2025/0018717 A1 Jan. 16, 2025

(30) Foreign Application Priority Data

Jul. 13, 2023 (JP) ................................ 2023-114983

(51) Int. Cl.
*B41J 2/165* (2006.01)
*B41J 2/17* (2006.01)
*B41J 13/08* (2006.01)

(52) U.S. Cl.
CPC ......... *B41J 2/16526* (2013.01); *B41J 2/1714* (2013.01); *B41J 2/1721* (2013.01); *B41J 13/08* (2013.01)

(58) Field of Classification Search
CPC .... B41J 2/16526; B41J 2/1714; B41J 2/1721; B41J 13/08; B41J 2/16508; B41J 2/16585; B41J 2/01
See application file for complete search history.

(56) References Cited

FOREIGN PATENT DOCUMENTS

| | | | | | |
|---|---|---|---|---|---|
| EP | 1162072 | A1 * | 12/2001 | .......... | B41J 2/16508 |
| JP | H 06-340092 | A | 12/1994 | | |
| JP | 2010023374 | A * | 2/2010 | ............. | B41J 11/06 |

OTHER PUBLICATIONS

English machine translation of Hitoshi et al. (EP 1162072 A1) (Year: 2001).*
English machine translation of Hisashi (JP 2010023374 A) (Year: 2010).*

* cited by examiner

*Primary Examiner* — Ricardo I Magallanes
*Assistant Examiner* — Natasha Dephenia Quinn
(74) *Attorney, Agent, or Firm* — Stein IP, LLC

(57) ABSTRACT

An inkjet recording apparatus includes a recording head, a conveyance member, a control unit, an ink collection unit, an ink passage and a suction unit. The ink passage is formed between the conveyance member and an ink reception portion. The suction unit is coupled to the ink reception portion, and sucks the ink that has passed through the opening together with air in the ink passage. In the conveyance member, an air circulation hole is formed on the upstream side of the opening in a conveyance direction. A distance between the opening and the air circulation hole in the conveyance direction is smaller than the width of the ink passage in the conveyance direction.

3 Claims, 8 Drawing Sheets

INKJET RECORDING APPARATUS

INCORPORATION BY REFERENCE

This application is based upon and claims the benefit of priority from the corresponding Japanese Patent Application No. 2023-114983 filed on Jul. 13, 2023, the entire contents of which are incorporated herein by reference.

BACKGROUND

The present disclosure relates to inkjet recording apparatuses.

Conventionally, in an inkjet recording apparatus such as an inkjet printer, in order to reduce or prevent clogging of nozzles caused by drying of an ink, flushing (idle discharge) is performed in which the ink is periodically discharged from the nozzles. For example, in an inkjet recording apparatus, an opening is provided in a conveyance belt which conveys a recording medium, and an ink is discharged from nozzles in a recording head to pass through the opening in the conveyance belt.

In the inkjet recording apparatus as described above, ink droplets which have passed through the opening in the conveyance belt by the flushing normally reach the top of an ink reception portion that receives the ink, are collected and are ejected from the ink reception portion as a waste liquid. Here, if the ink reception portion can be arranged in the vicinity of the ink discharge surface of the recording head, almost all the ink droplets can be collected by the ink reception portion. However, the conveyance belt is arranged between the recording head and the ink reception portion, and thus it is difficult to arrange the ink reception portion in the vicinity of the ink discharge surface. Consequently, the ink droplets are changed into the form of mist before reaching the ink reception portion to contaminate the inside of the apparatus.

SUMMARY

An inkjet recording apparatus according to a first aspect of the present disclosure includes a recording head, a conveyance member, a control unit, an ink collection unit, an ink passage and a suction unit. The recording head includes a plurality of nozzles which discharge an ink. The conveyance member includes an opening through which the ink discharged from the recording head passes, and conveys a recording medium. The control unit controls drive of the recording head and the conveyance member to perform flushing which discharges, with timing different from timing contributing to image recording, the ink from the nozzles of the recording head to cause the ink to pass through the opening. The ink collection unit is arranged opposite the recording head through the conveyance member and includes an ink reception portion which receives the ink that has passed through the opening when the flushing is performed. The ink passage is formed between the conveyance member and the ink reception portion, and the ink that has passed through the opening passes through the ink passage. The suction unit is coupled to the ink reception portion and sucks the ink that has passed through the opening together with air in the ink passage. In the conveyance member, an air circulation hole is formed on the upstream side of the opening in a conveyance direction. A distance between the opening and the air circulation hole in the conveyance direction is smaller than the width of the ink passage in the conveyance direction.

DETAILED DESCRIPTION

1. Configuration of Inkjet Recording Apparatus

Figure 1:
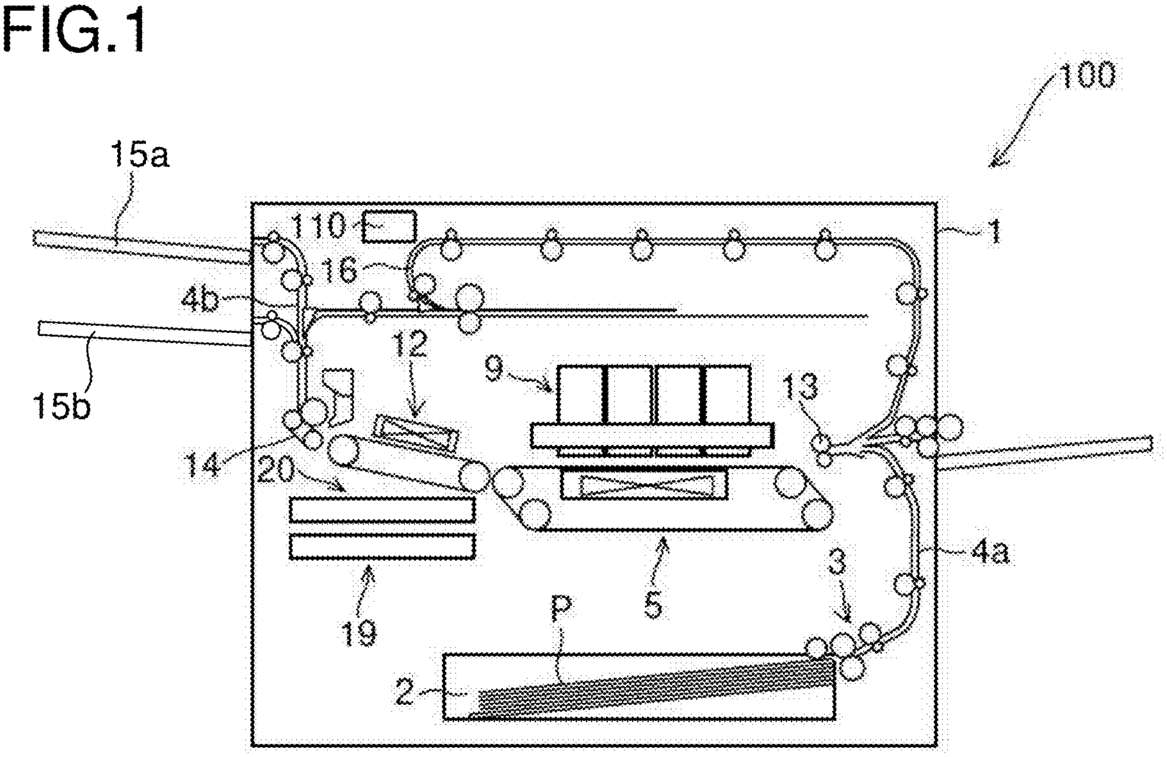
FIG. 1 is an illustrative view showing a schematic configuration of a printer serving as the inkjet recording apparatus of the present disclosure.

An embodiment of the present disclosure will be described below with reference to drawings. FIG. 1 is an illustrative view showing a schematic configuration of a printer 100 serving as an inkjet recording apparatus according to the embodiment of the present disclosure. The printer 100 includes a paper feed cassette 2 which is a sheet storage unit. The paper feed cassette 2 is arranged in a lower part of a printer main body 1. In the paper feed cassette 2, a sheet P which is an example of a recording medium is stored.

A paper feed device 3 is arranged on the downstream side of the paper feed cassette 2 in a sheet conveyance direction, that is, on the upper right side of the paper feed cassette 2 in FIG. 1. The paper feed device 3 separates and feeds out the sheets P one by one toward the upper right side of the paper feed cassette 2 in FIG. 1.

The printer 100 includes a first sheet conveyance path 4*a* thereinside. The first sheet conveyance path 4*a* is located on the upper right side of the paper feed cassette 2 along a paper feed direction. The sheet P fed out from the paper feed cassette 2 is conveyed by the first sheet conveyance path 4*a* along the side surface of the printer main body 1 upward in a vertical direction.

At the downstream end of the first sheet conveyance path 4*a* in the sheet conveyance direction, a registration roller pair 13 is provided. Furthermore, a first conveyance unit 5 and a recording unit 9 are arranged immediately on the downstream side of the registration roller pair 13 in the sheet conveyance direction. The sheet P fed out from the paper feed cassette 2 passes through the first sheet conveyance path 4*a* to reach the registration roller pair 13. While correcting the oblique feeding of the sheet P, the registration roller pair 13 measures timing with an ink discharge operation performed by the recording unit 9, and feeds out the sheet P toward the first conveyance unit 5 (in particular, a first conveyance belt 8 which will be described later).

The sheet P fed out by the registration roller pair 13 to the first conveyance unit 5 is conveyed by the first conveyance belt 8 to a position opposite the recording unit 9 (in particular, recording heads 17*a* to 17*c* which will be described later). Inks are discharged from the recording unit 9 to the sheet P, and thus an image is recorded on the sheet P. Here, the discharge of the inks performed by the recording unit 9 is controlled by a control device 110 inside the printer 100.

On the downstream side (left side in FIG. 1) of the first conveyance unit 5 in the sheet conveyance direction, a second conveyance unit 12 is arranged. The sheet P on which the image has been recorded by the recording unit 9 is fed to the second conveyance unit 12. The inks discharged on the surface of the sheet P are dried while the sheet P is passing through the second conveyance unit 12.

In the vicinity of the left side surface of the printer main body 1 on the downstream side of the second conveyance unit 12 in the sheet conveyance direction, a decurler portion 14 is provided. The sheet P on which the inks have been dried by the second conveyance unit 12 is fed to the decurler portion 14 where a curl occurring on the sheet P is corrected.

On the downstream side (upper side in FIG. 1) of the decurler portion 14 in the sheet conveyance direction, a second sheet conveyance path 4*b* is provided. When double-sided recording is not performed, the sheet P which has passed through the decurler portion 14 passes through the second sheet conveyance path 4*b*, and is ejected to a sheet ejection tray 15*a* which is provided outside the left side surface of the printer 100. Below the sheet ejection tray 15*a*, a sub-ejection tray 15*b* to which an unnecessary sheet P (waste paper) where a printing failure or the like occurs is ejected is provided.

In an upper part of the printer main body 1 above the recording unit 9 and the second conveyance unit 12, a reverse conveyance path 16 for performing the double-sided recording is provided. When the double-sided recording is performed, the sheet P in which recording on one side (first side) of the sheet P has been completed and which has passed through the second conveyance unit 12 and the decurler portion 14 passes through the second sheet conveyance path 4*b*, and is fed to the reverse conveyance path 16.

The conveyance direction of the sheet P fed to the reverse conveyance path 16 is then switched for recording on the other side (second side) of the sheet P. Then, the sheet P passes through the upper part of the printer main body 1, is fed toward the right side and is fed via the registration roller pair 13 again to the first conveyance unit 5 in a state where the second side is directed upward. In the first conveyance unit 5, the sheet P is conveyed to the position opposite the recording unit 9, and an image is recorded on the second side by the discharge of the inks from the recording unit 9. The sheet P after the double-sided recording passes through the second conveyance unit 12, the decurler portion 14 and the second sheet conveyance path 4*b* in this order, and is ejected to the sheet ejection tray 15*a*.

Below the second conveyance unit 12, a maintenance unit 19 and a cap unit 20 are arranged. When performing purging, the maintenance unit 19 moves horizontally below the recording unit 9, wipes off the inks pushed out from the ink discharge ports of the recording heads and collects the inks which have been wiped off. The purging refers to the operation of forcibly pushing out the inks from the ink discharge ports of the recording heads in order to eject thickened inks, foreign substances and air bubbles in the ink discharge ports. When capping the ink discharge surfaces of the recording heads, the cap unit 20 moves horizontally below the recording unit 9, further moves upward and is fitted to the lower surfaces of the recording heads.

Figure 2:
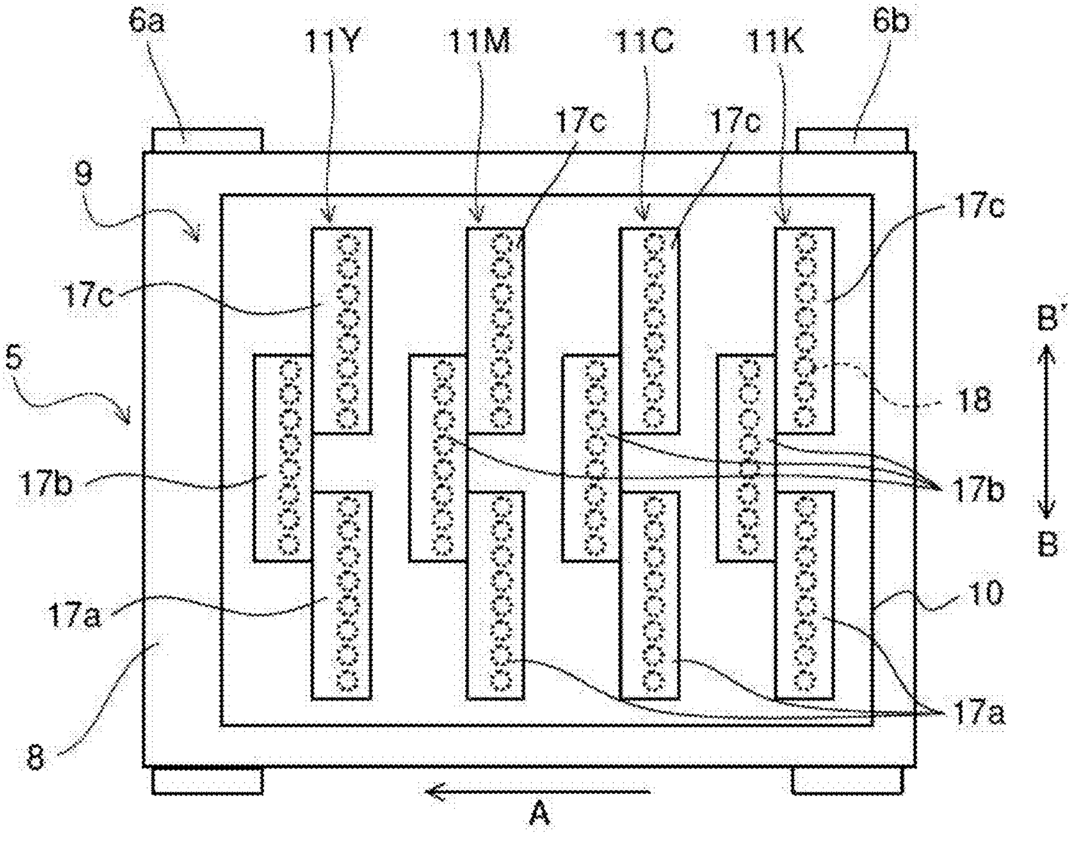
FIG. 2 is a plan view of a recording unit included in the printer of the present disclosure.

FIG. 2 is a plan view of the recording unit 9. The recording unit 9 includes a head housing 10 and line heads 11Y, 11M, 11C and 11K. The line heads 11Y to 11K are held by the head housing 10 at such a height that a predetermined distance (for example, 1 mm) is provided with respect to the conveyance surface of the seamless first conveyance belt 8 which is stretched over a plurality of rollers including a drive roller 6*a*, a driven roller 6*b* and tension rollers 7*a* and 7*b* (see FIG. 3). The drive roller 6*a* causes the first conveyance belt 8 to travel in the conveyance direction of the sheet P (direction indicated by an arrow A). The drive of the drive roller 6*a* is controlled by a main control unit 110*a* (see FIG. 4) in the control device 110. For the rollers described above, along the direction of travel of the first conveyance belt 8, the tension roller 7*a*, the tension roller 7*b*, the driven roller 6*b* and the drive roller 6*a* are arranged in this order (see FIG. 3).

Each of the line heads 11Y to 11K includes a plurality of (here, three) recording heads 17*a* to 17*c*. The recording heads 17*a* to 17*c* are arranged in a staggered configuration along the sheet width direction (direction indicated by arrows B and B') orthogonal to the sheet conveyance direction (direction indicated by the arrow A). Each of the recording heads 17*a* to 17*c* includes a plurality of ink discharge ports 18 (nozzles). The ink discharge ports 18 are regularly spaced in the width direction of the recording heads 17*a* to 17*c*, that is, the sheet width direction (direction indicated by the arrows B and B'). The inks of the individual colors of yellow (Y), magenta (M), cyan (C) and black (K) are respectively discharged from the line heads 11Y to 11K via the ink discharge ports 18 of the recording heads 17*a* to 17*c* toward the sheet P being conveyed by the first conveyance belt 8.

The inks of the four colors (yellow, cyan, magenta and black) stored in ink tanks (not shown) are respectively supplied to the recording heads 17*a* to 17*c* of the line heads 11Y to 11K so as to correspond to the colors of the line heads 11Y to 11K.

The recording heads 17*a* to 17*c* discharge, based on control signals from the control device 110 (see FIG. 4), the inks from the ink discharge ports 18 according to image data received from an external computer toward the sheet P which is sucked to be held to the conveyance surface of the first conveyance belt 8 and is conveyed. In this way, on the sheet P on the first conveyance belt 8, a color image is formed in which the four colors of yellow, cyan, magenta and black are superimposed on each other.

In order to clean the ink discharge surfaces of the recording heads 17*a* to 17*c*, when printing is started after being stopped for a long period of time or between printing operations, the printer 100 performs a recovery operation of the recording heads 17*a* to 17*c* by pushing out (purging) the inks from the ink discharge ports 18 of all the recording heads 17*a* to 17*c* and wiping off the inks discharged to the ink discharge surfaces with a wiper (not shown), and thereby prepares for the subsequent printing operation. The inks wiped off from the ink discharge surfaces are collected by ink collection units 31Y to 31K (see FIG. 3) which will be described later.

Figure 3:
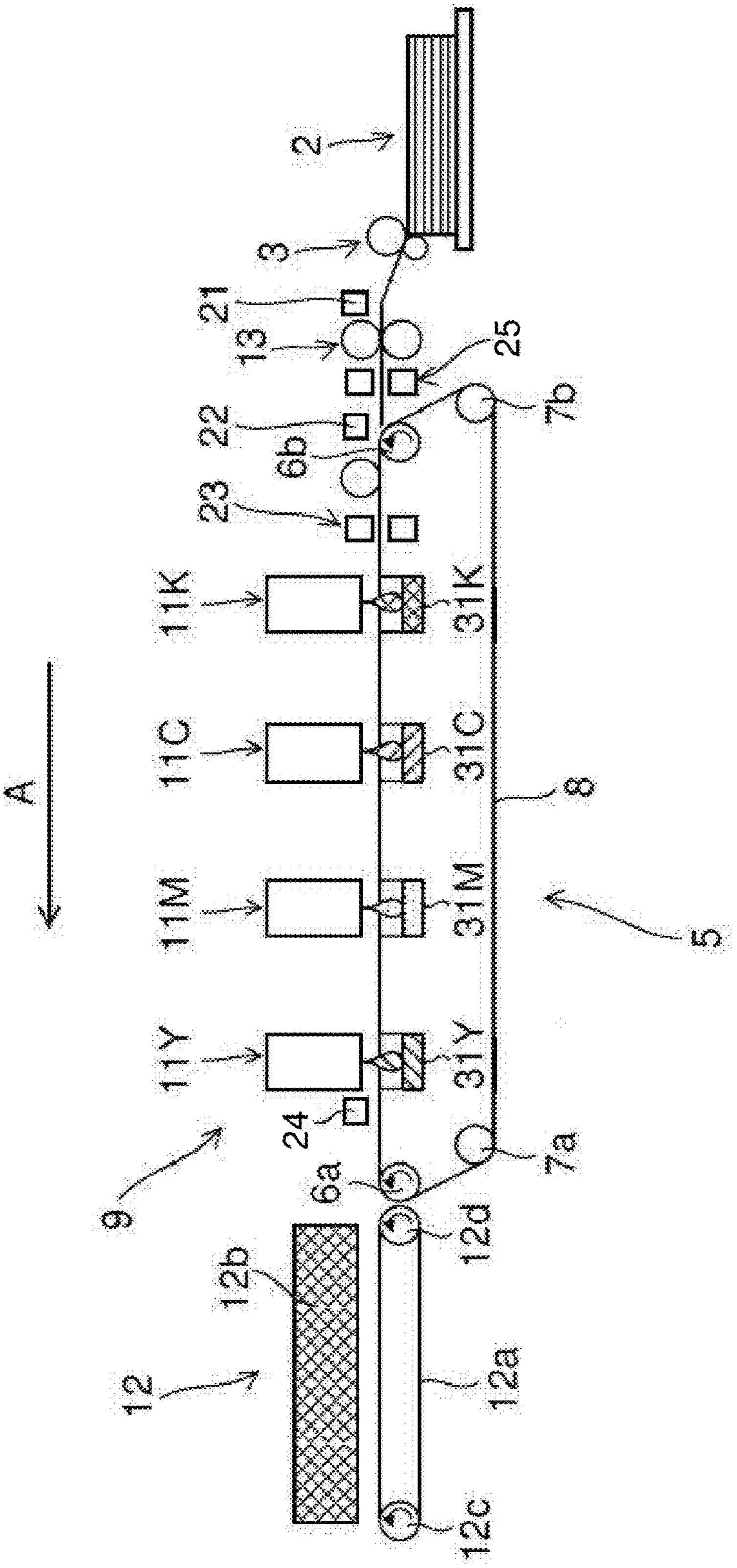
FIG. 3 is an illustrative view schematically showing the configuration of an area around a conveyance path for a sheet which extends from a paper feed cassette to a second conveyance unit via a first conveyance unit in the printer of the present disclosure.
Figure 4:
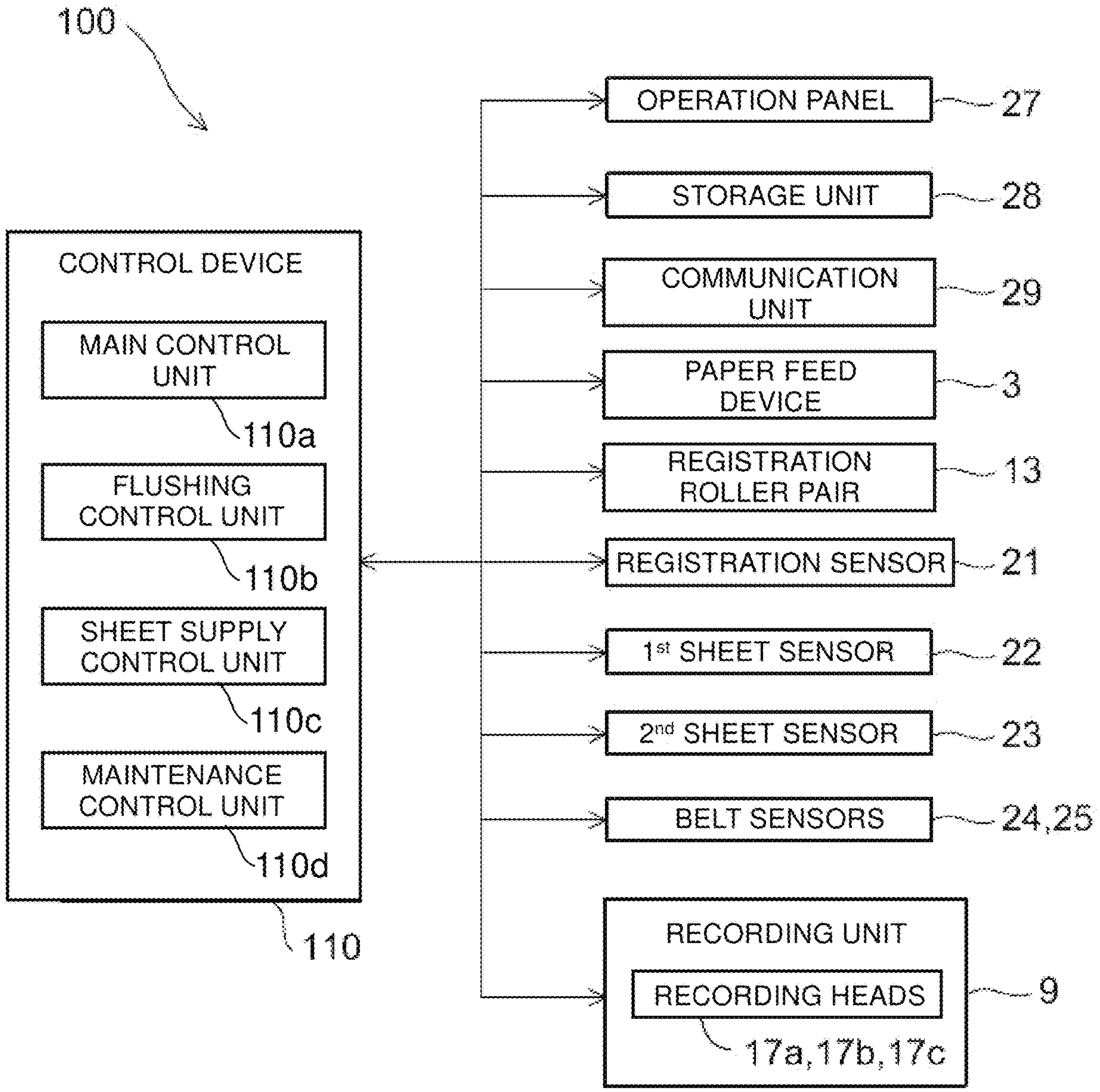
FIG. 4 is a block diagram showing the hardware configuration of a main portion of the printer of the present disclosure.

FIG. 3 schematically shows the configuration of an area around the conveyance path for the sheet P which extends from the paper feed cassette 2 to the second conveyance unit 12 via the first conveyance unit 5. FIG. 4 is a block diagram showing the hardware configuration of a main portion of the printer 100. The printer 100 further includes, in addition to the configuration described above, a registration sensor 21, a first sheet sensor 22, a second sheet sensor 23 and belt sensors 24 and 25.

The registration sensor 21 detects the sheet P which is conveyed from the paper feed cassette 2 by the paper feed device 3 and is fed to the registration roller pair 13. The registration sensor 21 is located on the upstream side in the supply direction of the sheet P relative to the registration roller pair 13. The control device 110 (for example, a sheet supply control unit 110*c*) controls, based on the result of the detection performed by the registration sensor 21, timing at which the rotation of the registration roller pair 13 is started. For example, the control device 110 controls, based on the result of the detection performed by the registration sensor 21, timing at which the sheet P after skew correction made by the registration roller pair 13 is supplied to the first conveyance belt 8.

The first sheet sensor 22 detects the position of the sheet P fed from the registration roller pair 13 to the first conveyance belt 8 in the width direction. The control device 110 (for example, the main control unit 110*a*) discharges, based on the result of the detection performed by the first sheet sensor 22, the inks from the ink discharge ports 18 corresponding to the width of the sheet P among the ink discharge ports 18 of the recording heads 17*a* to 17*c* of the line heads 11Y to 11K, and thereby can record the image on the sheet P.

The second sheet sensor 23 detects the passage of the sheet P supplied by the registration roller pair 13 to the first conveyance belt 8. In other words, the second sheet sensor 23 detects the position of the sheet P conveyed by the first conveyance belt 8 in the conveyance direction. The second sheet sensor 23 is located on the upstream side of the recording unit 9 and on the downstream side of the first sheet sensor 22 in the sheet conveyance direction. The control device 110 (for example, the main control unit 110*a*) can control, based on the result of the detection performed by the second sheet sensor 23, timing at which the inks are discharged to the sheet P which reaches a position opposite the line heads 11Y to 11K (the recording heads 17*a* to 17*c*) by the first conveyance belt 8.

The belt sensors 24 and 25 are reference detection sensors which detect reference identification portions (not shown) provided in the first conveyance belt 8. The reference identification portions are parts which indicate references for one revolution of the first conveyance belt 8. Since a positional relationship between the reference identification portions and openings 80 (see FIG. 8) is previously known, the belt sensors 24 and 25 detect the reference identification portions in the first conveyance belt 8, and thereby can detect, based on the positions of the detected reference identification portions, the positions of the openings 80 (opening group 82) provided in the first conveyance belt 8 in the conveyance direction. Hence, the belt sensors 24 and 25 function as opening position detection units which detect the positions of the openings 80 in the first conveyance belt 8.

At an end portion of the first conveyance belt 8 in the belt width direction, a mark is formed in a position corresponding to each opening group 82, and the belt sensors 24 and 25 detect the mark, with the result that the position of the opening group 82 (openings 80) corresponding to the mark may be detected.

The belt sensor 24 is located on the downstream side of the recording unit 9 in the sheet conveyance direction (the direction of travel of the first conveyance belt 8). The belt sensor 25 is located on the upstream side in the sheet conveyance direction relative to the driven roller 6*b* on which the first conveyance belt 8 is stretched. Although in the present embodiment, the belt sensor 25 is located between the driven roller 6*b* and the tension roller 7*b*, the belt sensor 25 may be located between the tension rollers 7*a* and 7*b*. The driven roller 6*b* is located on the upstream side in the direction of travel of the first conveyance belt 8 relative to the recording unit 9. The belt sensor 24 has the same function as the second sheet sensor 23. The control device 110 (for example, the sheet supply control unit 110*c*) can control, based on the result of the detection performed by the belt sensor 24 or 25, the registration roller pair 13 such that the registration roller pair 13 supplies the sheet P to the first conveyance belt 8 with predetermined timing.

The positions of the sheet P are detected with a plurality of sensors (the first sheet sensor 22 and the second sheet sensor 23), the reference identification portions in the first conveyance belt 8 are detected with a plurality of sensors (the belt sensors 24 and 25) and thus it is possible to correct errors in the detected positions and detect an abnormality.

The first sheet sensor 22, the second sheet sensor 23 and the belt sensors 24 and 25 described above may be formed with transmissive or reflective optical sensors, CIS sensors (Contact Image Sensor) or the like.

The printer 100 may include a meandering detection sensor which detects the meandering of the first conveyance belt 8 to correct the meandering of the first conveyance belt 8 based on the result of the detection.

The printer 100 further includes an operation panel 27, a storage unit 28 and a communication unit 29.

The operation panel 27 is an operation unit for receiving various types of setting inputs. For example, a user operates the operation panel 27 to be able to input information of the size of the sheet P which is set in the paper feed cassette 2, that is, the size of the sheet P which is conveyed by the first conveyance belt 8. The user also operates the operation panel 27 to be able to input the number of sheets P to be printed and to provide an instruction to start a print job. The operation panel 27 also has the function of a notification device which provides notification of the status of the operation of the printer 100 (image recording and flushing which will be described later).

The storage unit 28 is a memory which stores operation programs of the control device 110 and various types of information, and includes a ROM (Read Only Memory), a RAM (Random Access Memory), a nonvolatile memory and the like. Information (for example, information of the size of the sheet P and the number of sheets P) set with the operation panel 27 is stored in the storage unit 28.

The communication unit 29 is a communication interface for transmitting and receiving information to and from an external device (for example, a personal computer (PC)). For example, when the user operates the PC to transmit a print command together with image data to the printer 100, the image data and the print command are input via the communication unit 29 to the printer 100. In the printer 100, the main control unit 110*a* controls, based on the image data, the recording heads 17*a* to 17*c* to cause the recording heads 17*a* to 17*c* to discharge the inks, and thereby can record the image on the sheet P.

The printer 100 of the present embodiment includes the control device 110. The control device 110 includes, for example, a CPU (Central Processing Unit) and a memory. Specifically the control device 110 includes the main control unit 110*a*, a flushing control unit 110*b*, the sheet supply control unit 110*c* and a maintenance control unit 110*d*. Although the control units of the control device 110 are formed with one CPU, the control units may naturally be formed with separate CPUs.

The main control unit 110*a* controls the operations of the individual portions of the printer 100. For example, the drive of the rollers in the printer 100, the discharge of the inks from the recording heads 17*a* to 17*c* at the time of image formation (other than the flushing) and the like are controlled by the main control unit 110*a*.

The flushing control unit 110*b* causes the recording heads 17*a* to 17*c* to perform the flushing based on the detection of the positions of the openings 80 performed by the belt sensor 24 or 25.

The sheet supply control unit 110*c* is a recording medium supply control unit which controls the registration roller pair 13 serving as a recording medium supply unit. For example, the sheet supply control unit 110*c* controls the registration roller pair 13 based on the detection of the positions of the openings 80 performed by the belt sensor 24 or 25. The sheet supply control unit 110*c* can control the registration roller pair 13 independently of the detection of the positions (regardless of the detection of the positions) of the openings 80 performed by the belt sensor 24 or 25.

The maintenance control unit 110*d* performs control to cause the recording heads 17*a* to 17*c* to perform the purging for forcibly pushing out the inks from the ink discharge ports 18. When the maintenance control unit 110*d* causes the recording heads 17*a* to 17*c* to perform the purging, the maintenance control unit 110*d* also controls the drive of the maintenance unit 19 (for example, the movement and retraction of the maintenance unit 19 to the downward of recording unit 9).

As shown in FIG. 3, the printer 100 includes the ink collection units 31Y, 31M, 31C and 31K on the inner circumferential side of the first conveyance belt 8. The ink collection units 31Y to 31K receive and collect the inks which are discharged from the recording heads 17*a* to 17*c* to pass through the openings 80 in the first conveyance belt 8 when the recording heads 17*a* to 17*c* are caused to perform the flushing. Hence, the ink collection units 31Y to 31K are provided in a position opposite the recording heads 17*a* to 17*c* of the line heads 11Y to 11K through the first conveyance belt 8.

The second conveyance unit 12 includes a second conveyance belt 12*a* and a dryer 12*b*. The second conveyance belt 12*a* is stretched over two rollers which are a drive roller 12*c* and a driven roller 12*d*. The sheet P which has been conveyed by the first conveyance unit 5 and on which the image has been recorded by the discharge of the inks performed by the recording unit 9 is conveyed by the second conveyance belt 12*a*, is dried by the dryer 12*b* while being conveyed and is conveyed to the decurler portion 14 described above.

2. Details of Ink Collection Units

Figure 5:
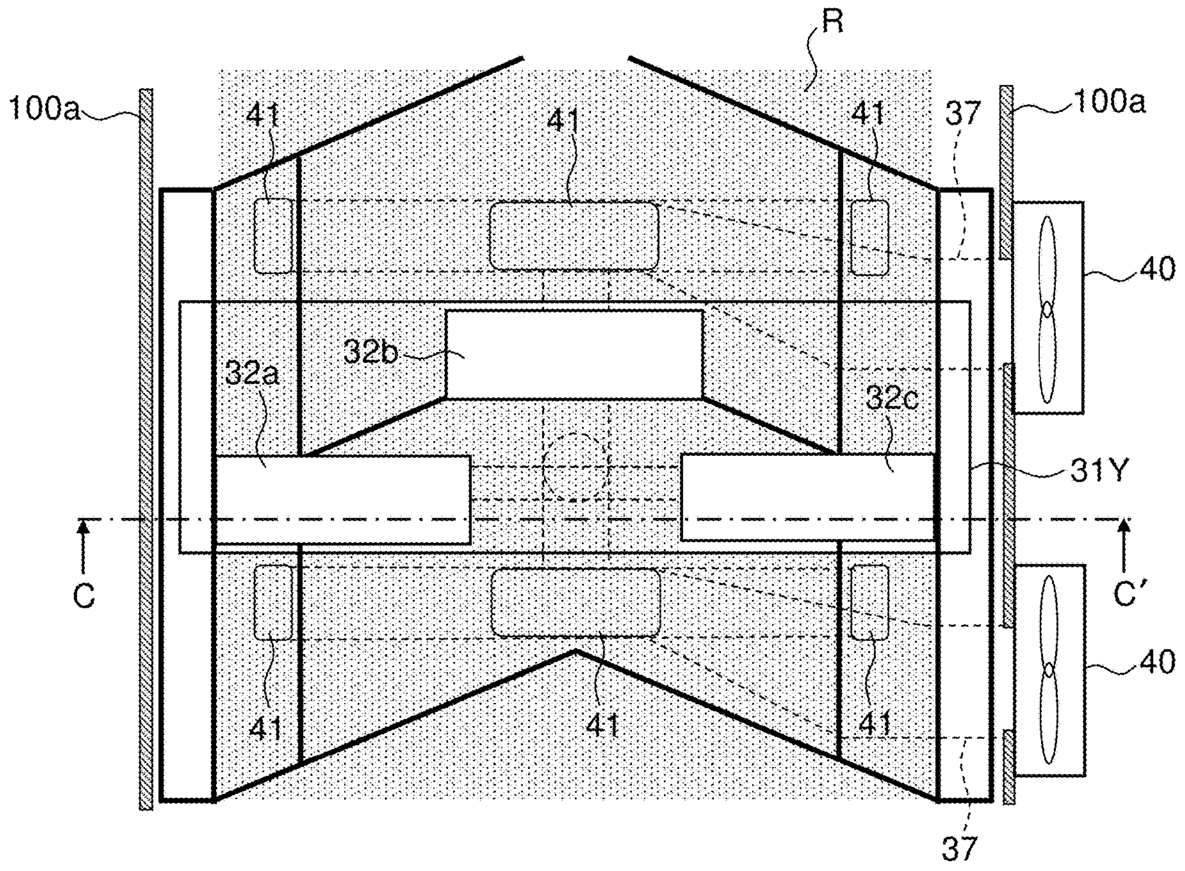
FIG. 5 is a schematic view showing an ink collection unit and a sheet conveyance region adjacent to the ink collection unit.

The configuration of the ink collection units 31Y to 31K will then be described in detail. FIG. 5 is a schematic view showing the ink collection unit 31Y and a sheet conveyance region adjacent to the ink collection unit 31Y. For convenience of description, in FIG. 5, the first conveyance belt 8 is omitted. Although the configuration of an area around the ink collection unit 31Y will be described below, the ink collection units 31M to 31K have the same configuration, and thus the description thereof is omitted.

The ink collection unit 31Y is arranged between a pair of side surface frames 100*a* opposite the recording heads 17*a* to 17*c* (see FIG. 2) of the line head 11Y. In the upper surface of the ink collection unit 31Y, ink reception portions 32*a* to 32*c* are provided which receive ink droplets discharged from the recording heads 17*a* to 17*c*.

Suction fans 40 which are suction units are attached to two parts of the side surface frame 100*a*, and one end portions of suction ducts 37 are coupled thereto. A plurality of suction ports 41 are provided at the other end portions of the suction ducts 37. The suction ports 41 are arranged opposite the inner circumferential surface of the first conveyance belt 8 (see FIG. 3). In the first conveyance belt 8, a large number of suction holes 8*a* for air suction (see FIG. 8) are provided. When the suction fans 40 are operated, air on the outer circumferential surface of the first conveyance belt 8 is sucked through the suction holes 8*a*. More specifically, air in a sheet suction region R (hatched region in FIG. 5) other than the ink reception portions 32*a* to 32*c* is sucked. In this configuration, the sheet P is sucked by suction air generated in the sheet suction region R to the conveyance surface of the first conveyance belt 8 and is conveyed.

Figure 6:
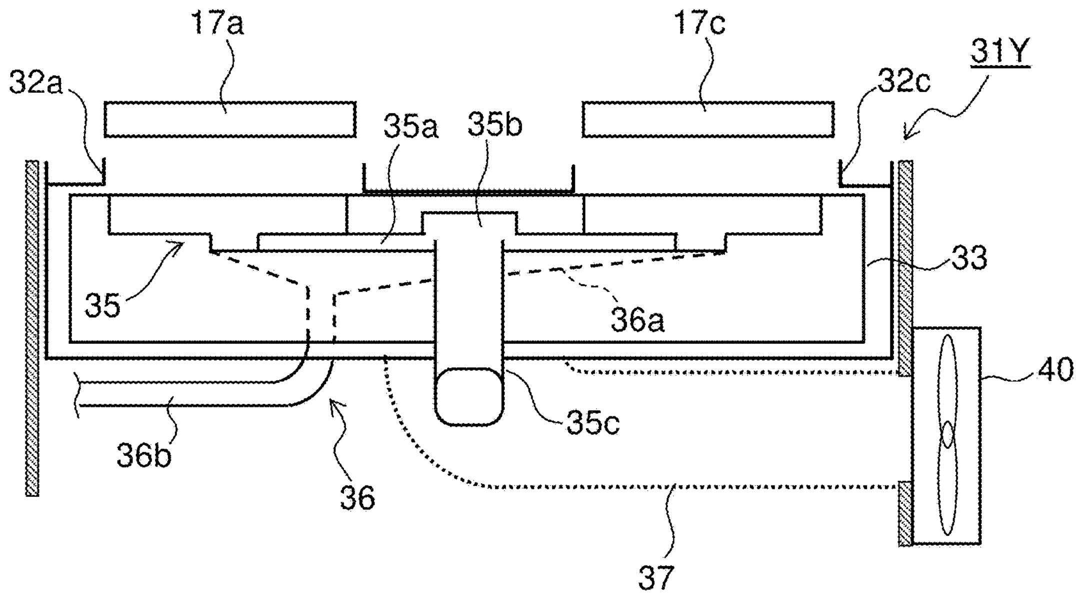
FIG. 6 is a side cross-sectional view when the ink collection unit is taken along a direction orthogonal to a conveyance direction.
Figure 7:
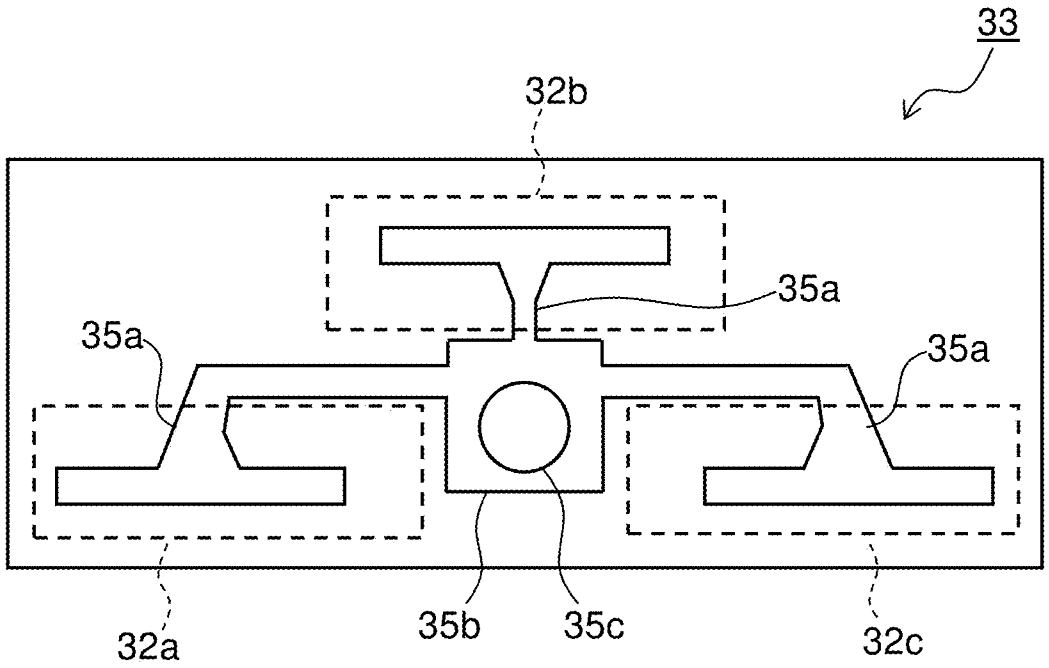
FIG. 7 is a plan cross-sectional view of a waste ink tank included in the ink collection unit.

FIG. 6 is a side cross-sectional view (cross-sectional view taken along line CC' indicated by arrows in FIG. 5) when the ink collection unit 31Y is taken along a direction orthogonal to the conveyance direction. FIG. 7 is a plan cross-sectional view of a waste ink tank 33 included in the ink collection unit 31Y. The waste ink tank 33 is arranged below the ink reception portions 32*a* to 32*c*. In the waste ink tank 33, a suction path 35 and an ink collection path 36 are provided.

The suction path 35 is formed of, for example, a resin material, and includes first flow paths 35*a*, a merging chamber 35*b* and a second flow path 35*c*. The first flow paths 35*a* communicate with the ink reception portions 32*a* to 32*c*. In the merging chamber 35*b*, the three first flow paths 35*a* communicating with the ink reception portions 32*a* to 32*c* merge into one. An upper end portion of the second flow path 35*c* communicates with the merging chamber 35*b*, and a lower end portion is open in the duct 37. In the configuration described above, the ink reception portions 32*a* to 32*c* are coupled to the suction fans 40 via the suction path 35 and the suction ducts 37.

The ink droplets included in an air flow passing through the interior of the suction path 35 collide with the inner wall surfaces of the first flow paths 35*a* and the merging chamber 35*b* so as to be stored in a lower part. The ink stored in the lower part of the waste ink tank 33 is ejected by the ink collection path 36 to the outside.

The ink collection path 36 includes an inclination portion 36*a* and an ink ejection tube 36*b*. The inclination portion 36 is formed below and adjacent to the first flow paths 35*a* and the merging chamber 35*b*, and the ink ejection tube 36*b* is coupled to the lowest portion (bottom) of the inclination portion 36*a*. The ink droplets adhered to the inner wall surfaces of the first flow paths 35*a* and the merging chamber 35*b* flow downward along the inner wall surfaces, and then flow along the inclination portion 36*a* so as to be collected in one part (lowest portion). Then, the ink droplets pass through the ink ejection tube 36*b*, and are collected in a waste ink collection bottle (not shown).

Although here, the ink collection path 36 is provided which collects the inks stored in the waste ink tank 33, instead of the ink collection path 36, an ink absorber such as melamine sponge may be arranged in the waste ink tank 33. In such a case, the ink absorbed by the ink absorber is stored in the waste ink tank 33 without being processed, and is discarded or collected when the waste ink tank 33 is replaced.

3. Details of First Conveyance Belt

Figure 8:
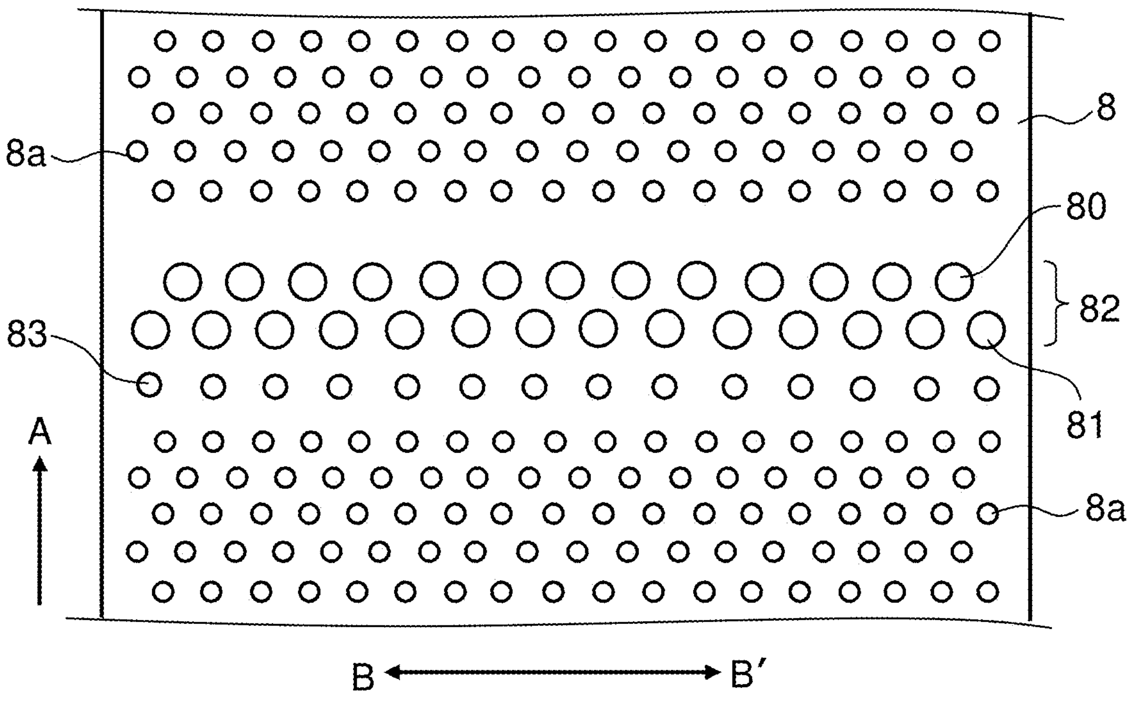
FIG. 8 is a plan view of an area around an opening group in a first conveyance belt included in the printer according to the first embodiment of the present disclosure.

The first conveyance belt 8 of the first conveyance unit 5 will then be described in detail. FIG. 8 is a partial enlarged view of an area around the opening group 82 in the first conveyance belt 8 used in the printer 100 according to the first embodiment of the present disclosure.

In the present embodiment, a negative pressure suction system is adopted in which the sheet P is sucked to the first conveyance belt 8 by negative pressure suction performed by the suction fans 40 and is conveyed. Hence, in the entire region of the first conveyance belt 8, a large number of suction holes 8*a* are formed through which the air flow (suction air) for sucking the sheet P to the first conveyance belt 8 by the negative pressure suction passes.

The first conveyance belt 8 includes a plurality of openings 80 through which the inks discharged from the nozzles (the ink discharge ports 18) of the recording heads 17*a* to 17*c* when the flushing is performed pass. In the present embodiment, the opening group 82 which includes a plurality of openings 80 is linearly formed over the entire region of the first conveyance belt 8 in the width direction. The openings 80 include a row of most upstream openings 81 located on the upstream side (lower side in FIG. 8) in the conveyance direction (direction indicated by the arrow A) of the first conveyance belt 8.

Although in the present embodiment, the shape of each of the openings 80 in plan view is circular as shown in FIG. 8, the shape may be rectangular or may be a long hole (for example, an oval shape) in the belt width direction (direction indicated by the arrows B and B'). The number of openings 80 in one row may be the same as the number of openings 80 (most upstream openings 81) in the other row.

The opening group 82 shown in FIG. 8 is assumed to be one set, and a plurality of sets of opening groups 82 are formed in the circumference of the first conveyance belt 8. Intervals between the sets of the opening groups 82 in the conveyance direction are not the same, and the opening groups 82 are formed irregularly in positions corresponding to the size of the sheet P to be conveyed. In other words, intervals between two sets of the opening groups 82 adjacent to each other in the sheet conveyance direction are not constant but vary. Here, the maximum interval between two sets of the opening groups 82 adjacent to each other in the sheet conveyance direction is longer than the length of the sheet P of the minimum printable size (for example, an A4 size set horizontally) in the sheet conveyance direction when the sheet P is placed on the first conveyance belt 8.

Air circulation holes 83 are formed immediately on the upstream side of the opening group 82 in the conveyance direction (direction indicated by the arrow A) of the first conveyance belt 8. A plurality of air circulation holes 83 are formed substantially over the entire region of the first conveyance belt 8 in the width direction. More specifically, the same number of air circulation holes 83 as the most upstream openings 81 are spaced the same distance as the most upstream openings 81 from each other.

Figure 9:
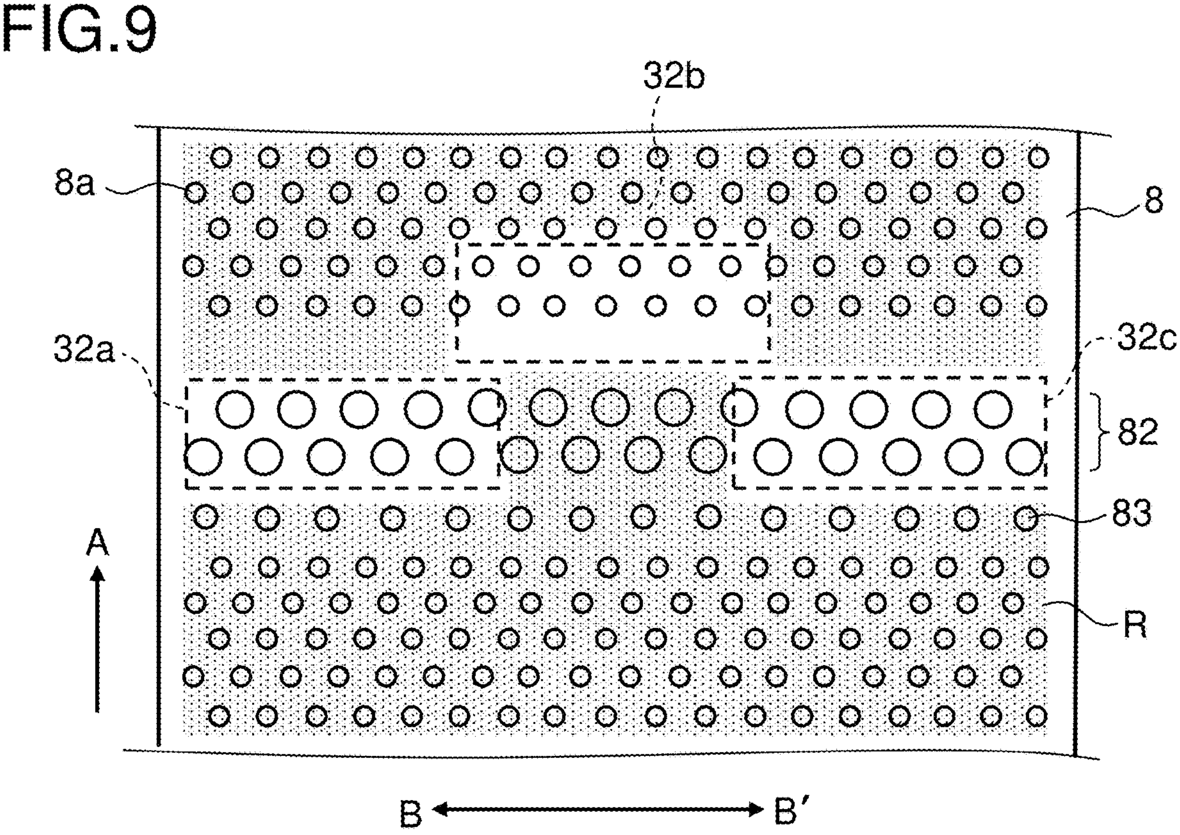
FIG. 9 is a plan view showing a positional relationship between the opening group in the first conveyance belt and ink reception portions in the printer of the first embodiment.

FIG. 9 is a plan view showing a positional relationship between the opening group 82 in the first conveyance belt and the ink reception portions 32*a* to 32*c*. As shown in FIG. 9, when the first conveyance belt 8 is moved in the conveyance direction (direction indicated by the arrow A), and thus the opening group 82 overlaps the ink reception portions 32*a* and 32*c*, the recording heads 17*a* and 17*c* perform the flushing. When in the state of FIG. 9, the first conveyance belt 8 is further moved in the conveyance direction, and thus the opening group 82 overlaps the ink reception portion 32*b*, the recording head 17*b* performs the flushing. The inks discharged from the ink discharge ports 18 of the recording heads 17*a* to 17*c* pass through any one of the openings 80 in the opening group 82. Hence, the recording heads 17*a* to 17*c* are caused to perform the flushing over the entire width of the heads, and thus it is possible to reduce clogging of all the ink discharge ports 18 caused by drying of the inks.

4. Suction Assistance Action by Air Circulation Holes

Figure 10:
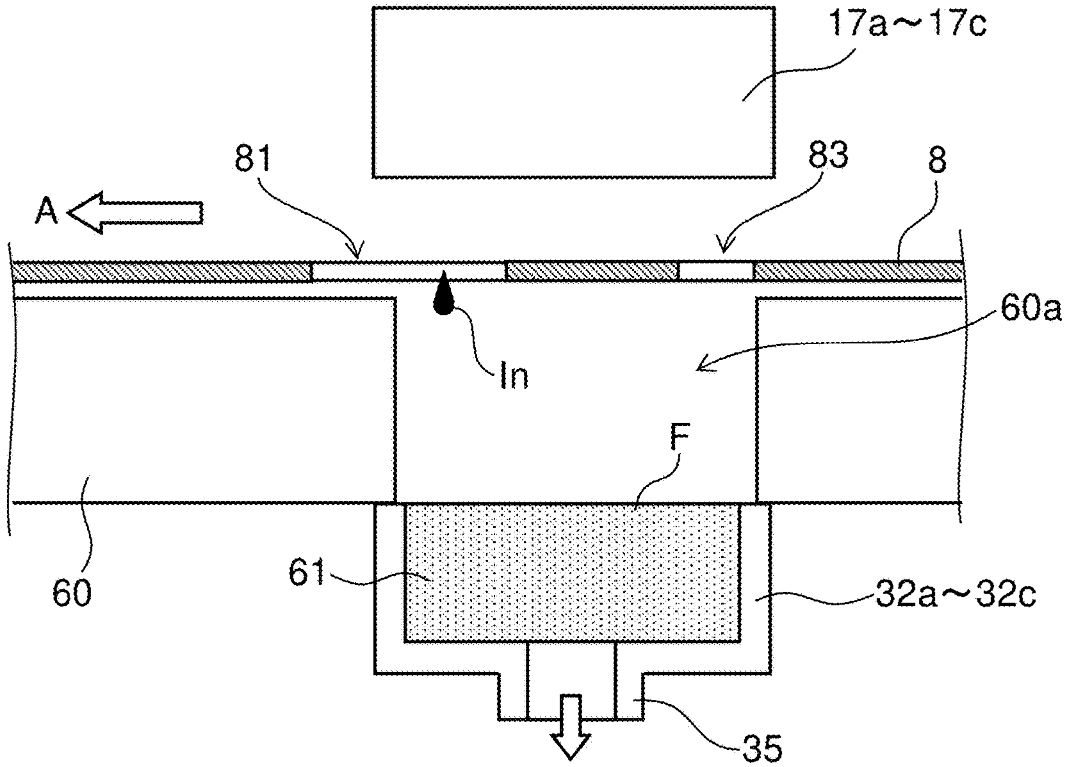
FIG. 10 is a side cross-sectional view showing a state where most upstream openings in the first conveyance belt pass through the ink reception portions in the printer of the first embodiment.
Figure 11:
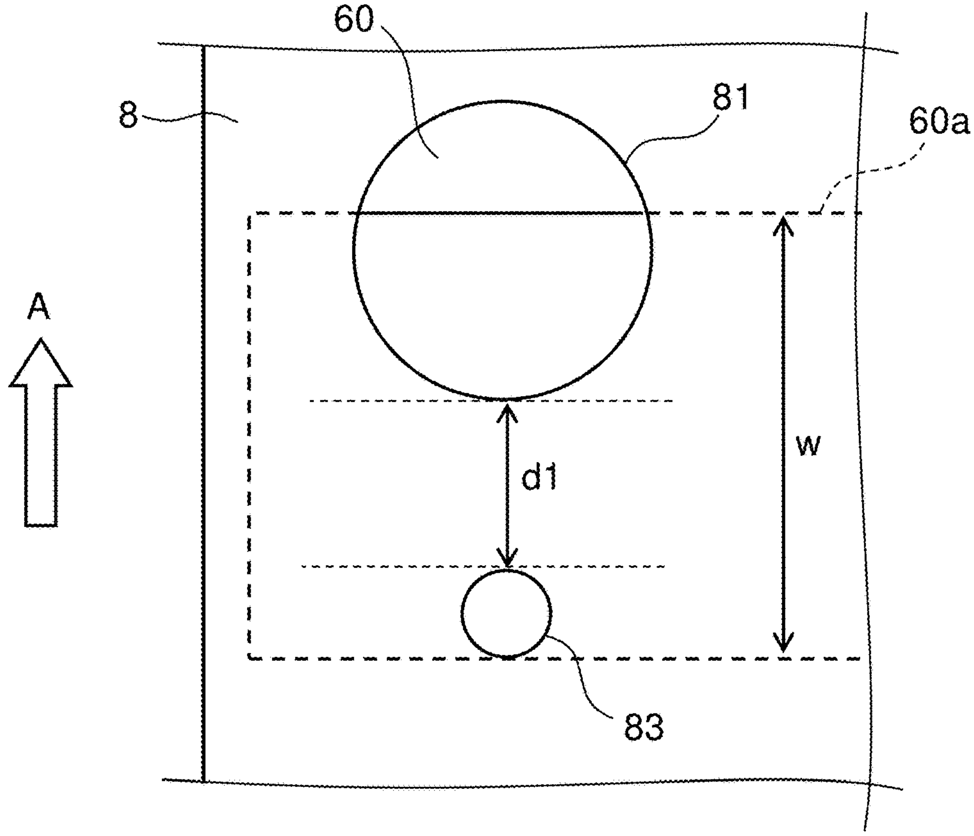
FIG. 11 is a partial enlarged view of an area around the most upstream opening in the first conveyance belt in the printer of the first embodiment, and shows a positional relationship between the most upstream opening and an air circulation hole.

Suction assistance action caused by the air circulation holes 83 which is a characteristic part of the printer 100 of the present embodiment will then be described. FIG. 10 is a side cross-sectional view showing a state where the most upstream openings 81 in the first conveyance belt 8 pass through the ink reception portions 32*a* to 32*c* in the printer 100 of the first embodiment. FIG. 11 is a plan view of an area around the most upstream opening 81 in the first conveyance belt 8, and is a diagram showing a positional relationship between the most upstream opening 81 and the air circulation hole 83.

As shown in FIG. 10, a belt support plate 60 is arranged between the first conveyance belt 8 and the ink reception portions 32*a* to 32*c*. The belt support plate 60 is arranged opposite the inner circumferential surface of the first conveyance belt 8 to support the first conveyance belt 8 from inside. Below the recording heads 17*a* to 17*c*, the belt support plate 60 is not present, and between the recording heads 17*a* to 17*c* and the ink reception portions 32*a* to 32*c*, an ink passage 60*a* is formed. The ink passage 60*a* also has the function of a duct through which the suction air passes, and the suction air is generated by the suction fans 40 (see FIG. 5) and is intended for sucking the ink droplets In discharged from the recording heads 17*a* to 17*c*.

The interior of the ink reception portions 32*a* to 32*c* is filled with an ink absorber 61. The ink absorber 61 is formed of a porous material such as sponge. The upper surface of the ink absorber 61 serves as a reception surface F for the ink droplets.

When after the most upstream openings 81 of the opening group 82 in the first conveyance belt 8 pass through the ink passage 60*a*, the upper portion of the ink passage 60*a* is blocked by the first conveyance belt 8, the suction fans 40 cannot suck air in the ink passage 60*a*. Hence, it is impossible to suck the ink droplets together with the suction air to collect the ink droplets in the ink reception portions 32*a* to 32*c*, and thus the ink droplets which are changed into the form of mist stay in the ink passage 60*a*.

As the first conveyance belt 8 is moved, turbulence in the airflow occurs such that the airflow approaches the first conveyance belt 8 from the front side and the back side of the first conveyance belt 8 and then reverses. Under the influence of this airflow, the ink droplets in the form of mist staying in the ink passage 60*a* are adhered to the back surface of the first conveyance belt 8 and are deposited. Consequently, this leads to contamination in the printer 100.

Hence, in the present embodiment, the air circulation holes 83 are formed immediately on the upstream side of the most upstream openings 81 in the conveyance direction (direction indicated by the arrow A) of the first conveyance belt 8. In this way, even after the most upstream openings 81 pass through the upper portion of the ink passage 60*a*, a state where the interior of the ink passage 60*a* communicates with the outside is maintained by the air circulation holes 83. Hence, the ink droplets In are sucked together with the suction air, and thus the ink droplets In are caused to reach the reception surfaces F of the ink reception portions 32*a* to 32*c*, with the result that the inks can be reliably collected.

Therefore, the inks can be reliably collected by the ink reception portions 32*a* to 32*c* without staying in the ink passage 60*a*, and thus it is possible to maintain image quality by the flushing while suppressing contamination on the back surface of the first conveyance belt 8 and contamination in the printer 100.

The size, the shape, the number and the formation position of the air circulation holes 83 will then be described. Although in the present embodiment, the circular air circulation holes 83 having a smaller diameter than the openings 80 (the most upstream openings 81) are formed, the size and the shape of the air circulation holes 83 are not particularly limited, and for example, the air circulation holes 83 in the shape of a long hole extending in the belt width direction can be formed. However, as the size of the air circulation holes 83 is increased, the strength of the first conveyance belt 8 is lowered. Hence, as long as the air in the ink passage 60*a* can be sucked, the size of the air circulation holes 83 is preferably minimized.

Although the number of air circulation holes 83 and the distance between the air circulation holes 83 are not particularly limited, for example, when the air circulation holes 83 are formed in three places, that is, in the center and in both end portions in the belt width direction, the distance between each of the most upstream openings 81 and the air circulation holes 83 is different. Hence, on each of the most upstream openings 81, the influence of an airflow which passes through the air circulation holes 83 is different, and thus a displacement in the reception of the ink droplets which pass through the most upstream opening 81 under the strong influence of the airflow may occur.

Hence, as in the present embodiment, the same number of air circulation holes 83 as the most upstream openings 81 are spaced the same distance as the most upstream openings 81 from each other, and thus on each of the most upstream openings 81, the influence of the airflow which passes through the air circulation holes 83 is constant. In this way, it is possible to suppress a displacement in the reception of the ink droplets which pass through the most upstream openings 81.

As shown in FIG. 11, a distance d1 between the most upstream opening 81 and the air circulation hole 83 in the conveyance direction (direction indicated by the arrow A) of the first conveyance belt 8 needs to be smaller than the width W of the ink passage 60*a* in the conveyance direction. In this configuration, after the most upstream openings 81 pass through the ink passage 60*a*, the air circulation holes 83 overlap the upper portion of the ink passage 60*a*, and thus it is possible to secure the suction assistance action caused by the air circulation holes 83.

Figure 12:
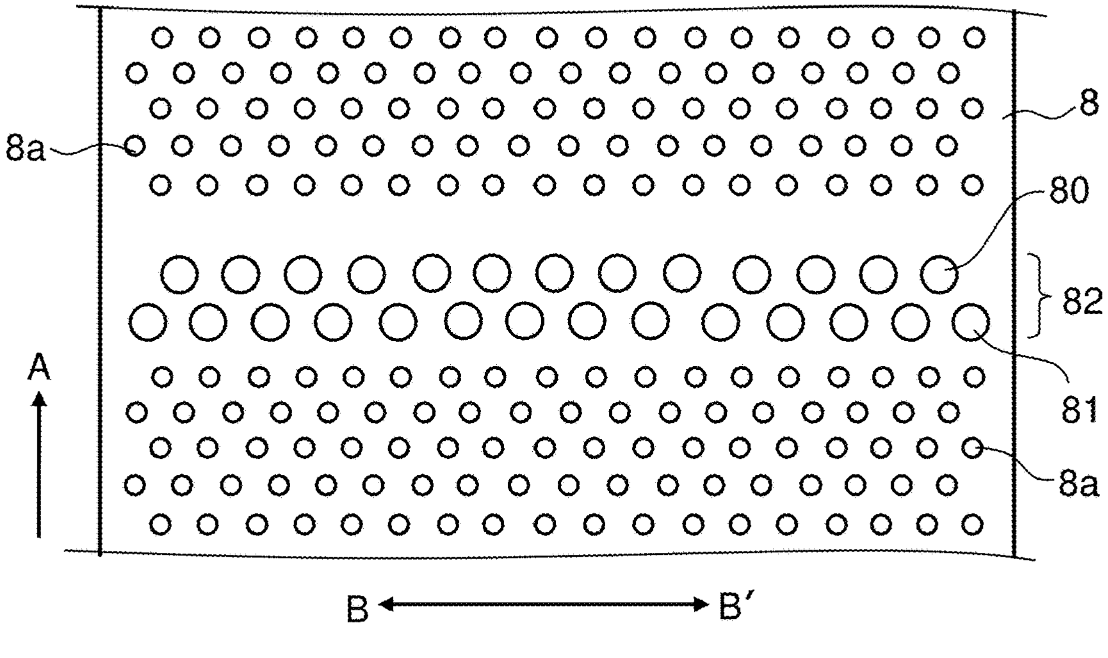
FIG. 12 is a plan view of an area around an opening group in a first conveyance belt included in a printer according to the second embodiment of the present disclosure.
Figure 13:
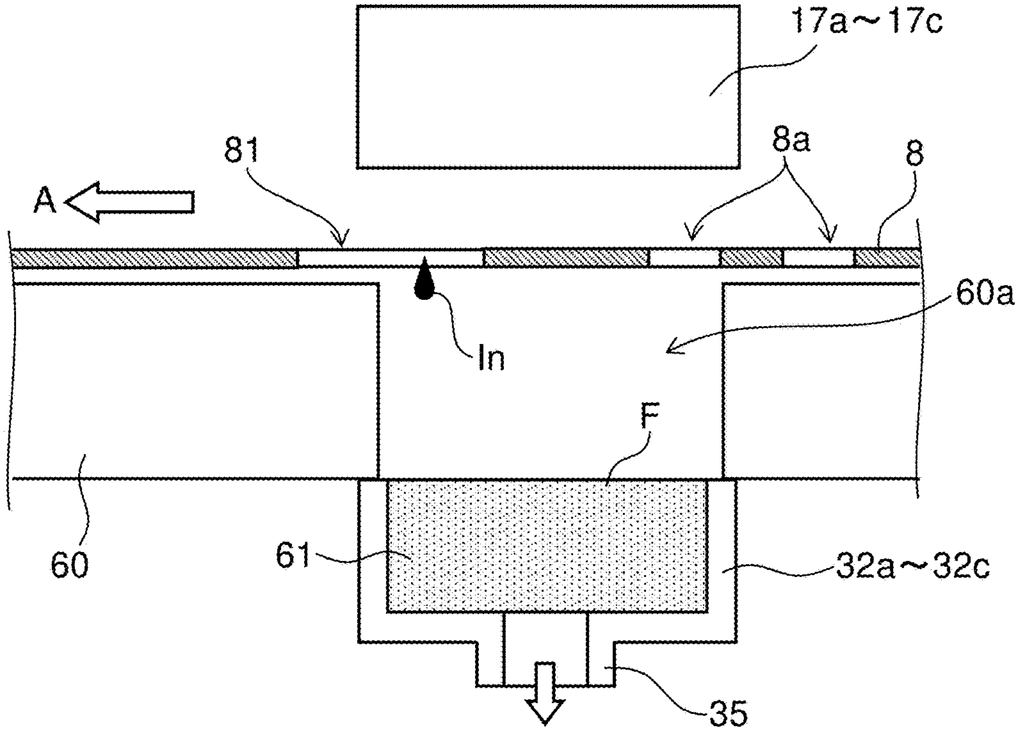
FIG. 13 is a side cross-sectional view showing a state where most upstream openings in the first conveyance belt pass through ink reception portions in the printer of the second embodiment.
Figure 14:
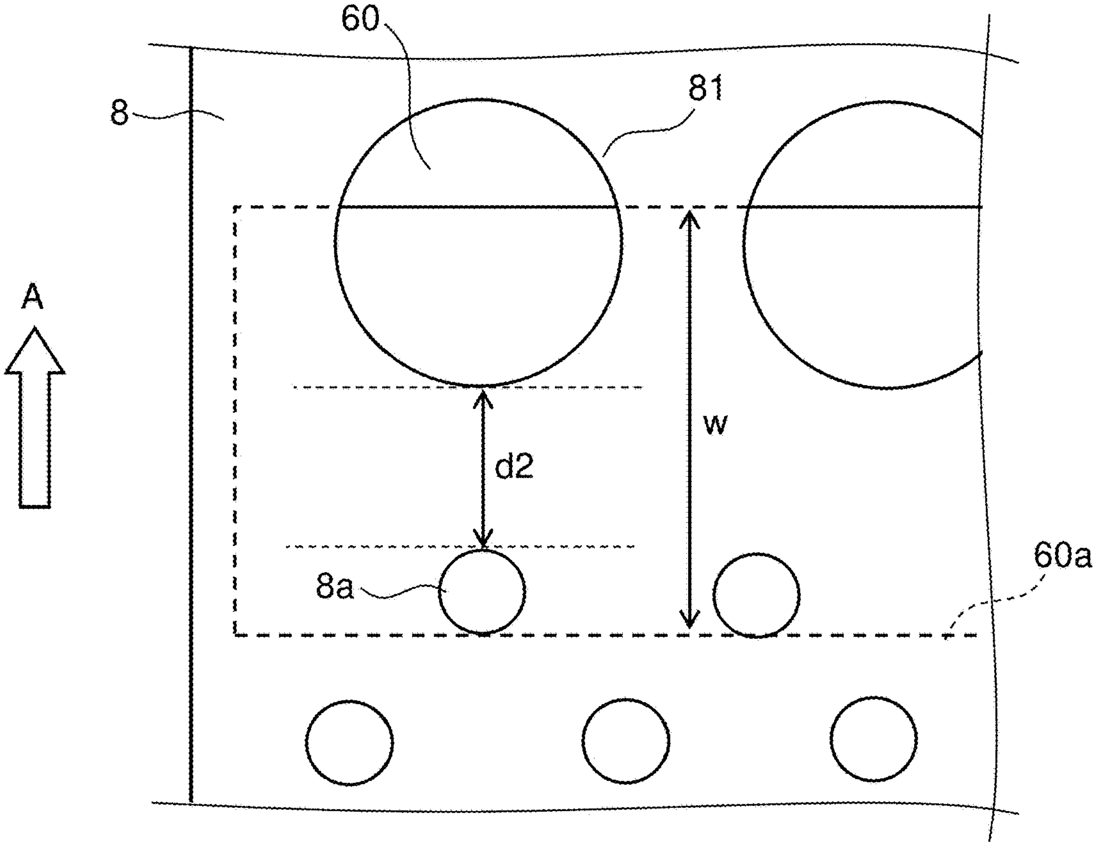
FIG. 14 is a partial enlarged view of an area around the most upstream openings in the first conveyance belt in the printer of the second embodiment, and shows a positional relationship between the most upstream openings and suction holes.

FIG. 12 is a plan view of an area around an opening group 82 in a first conveyance belt 8 included in a printer 100 according to the second embodiment of the present disclosure. FIG. 13 is a side cross-sectional view showing a state where most upstream openings 81 in the first conveyance belt 8 pass through ink reception portions 32*a* to 32*c* in the printer 100 of the second embodiment. FIG. 14 is a plan view of an area around the most upstream openings 81 in the first conveyance belt 8 in the printer 100 of the second embodiment, and shows a positional relationship between the most upstream openings 81 and suction holes 8*a*.

As shown in FIG. 12, in the present embodiment, the air circulation holes 83 are not formed in the first conveyance belt 8, and the suction holes 8*a* on the upstream side (lower side in FIG. 12) of the opening group 82 in the conveyance direction (direction indicated by the arrow A) of the first conveyance belt 8 are formed close to the most upstream openings 81. In other words, the suction holes 8*a* on the upstream side of the opening group 82 also serve as the air circulation holes 83.

In this way, as shown in FIG. 13, even after the most upstream openings 81 pass through the upper portion of the ink passage 60*a*, a state where the interior of the ink passage 60*a* communicates with the outside is maintained by the suction holes 8*a*. Hence, as in the first embodiment, the ink droplets In are sucked together with the suction air, and thus the ink droplets In are caused to reach the reception surfaces F of the ink reception portions 32*a* to 32*c*, with the result that the inks can be reliably collected.

As shown in FIG. 14, a distance d2 between the most upstream opening 81 and the suction holes 8*a* in the conveyance direction (direction indicated by the arrow A) of the first conveyance belt 8 needs to be smaller than the width W of the ink passage 60*a* in the conveyance direction. In this configuration, after the most upstream openings 81 pass through the ink passage 60*a*, the suction holes 8*a* overlap the upper portion of the ink passage 60*a*, and thus it is possible to secure the suction assistance action caused by the suction holes 8*a*.

5. Others

The present disclosure is not limited to the embodiments described above, and various changes can be made without departing from the spirit of the present disclosure. For example, although in the above embodiment, the configuration in which the three recording heads 17*a* to 17*c* for one color of the line heads 11Y to 11K are arranged in a staggered configuration has been described, the present disclosure is not limited to this configuration. For example, the present disclosure can be applied to a configuration in which the recording heads 17*a* to 17*c* of the line heads 11Y to 11K are linearly arranged.

Although in the above embodiments, the configuration using the first conveyance belt 8 in which the opening groups 82 including a plurality of openings 80 are arranged irregularly in the positions corresponding to the size of the sheet in the conveyance direction has been described, the first conveyance belt 8 in which the sets of opening groups 82 are spaced in the sheet conveyance direction can be used.

Although in the embodiments described above, in order to secure the strength of the first conveyance belt 8, a plurality of small diameter openings 80 are provided in the first conveyance belt 8, and thus the discharge range of the entire region of the recording heads 17*a* to 17*c* in the width direction is covered, the present disclosure is not limited to this configuration. For example, depending on the configuration of the printer 100, if the strength of the first conveyance belt 8 can be secured by supporting the first conveyance belt 8 with the belt support plate 60, the discharge range of the entire region of the recording heads 17*a* to 17*c* in the width direction can be covered by a single opening 80 elongated in the width direction. In this case, the air circulation holes 83 are formed on the upstream side of the single opening 80, and thus a distance between the opening 80 and the air circulation holes 83 is preferably smaller than the width of the ink passage 60*a* in the conveyance direction.

Although in the above embodiments, the case where the sheet P is sucked to the first conveyance belt 8 by the negative pressure suction and is conveyed has been described, the first conveyance belt 8 may be charged such that the sheet P is electrostatically sucked to the first conveyance belt 8 and is conveyed (electrostatic suction system). For example, when the sheet P is electrostatically sucked in the first embodiment, the suction holes 8*a* in the first conveyance belt 8 are not needed.

Although in the embodiments described above, as the inkjet recording apparatus, the color printer which uses the inks of the four colors to record a color image has been described, the present disclosure can also be applied to a monochrome printer which uses the ink of black to record a monochrome image.

The present disclosure can be utilized for inkjet recording apparatuses such as an inkjet printer.

What is claimed is:

1. An inkjet recording apparatus comprising:

a recording head that includes a plurality of nozzles which discharge an ink;

a conveyance member that includes an opening through which the ink discharged from the recording head passes, and conveys a recording medium;

a control unit that controls drive of the recording head and the conveyance member to perform flushing which discharges, with timing different from timing contributing to image recording, the ink from the nozzles of the recording head to cause the ink to pass through the opening;

an ink collection unit that is arranged opposite the recording head through the conveyance member and includes an ink reception portion which receives the ink that has passed through the opening when the flushing is performed;

an ink passage which is formed between the conveyance member and the ink reception portion and through which the ink that has passed through the opening passes; and a suction unit that is coupled to the ink reception portion and sucks the ink that has passed through the opening together with air in the ink passage, wherein in the conveyance member, a plurality of air circulation holes are formed on an upstream side of the opening in a conveyance direction, a distance between the opening and the air circulation holes in the conveyance direction is smaller than a width of the ink passage in the conveyance direction, in the conveyance member, a large number of suction holes are formed, and an air flow for sucking the recording medium to the conveyance member by negative pressure suction flows through the suction holes, and an opening diameter of the air circulation holes is larger than an opening diameter of the suction holes, and an interval between the air circulation holes in a direction orthogonal to the conveyance direction is larger than an interval between the suction holes.

2. The inkjet recording apparatus according to claim 1, wherein in the conveyance member, one or more opening groups are formed, and each of the opening groups includes a plurality of the openings which are arranged in the conveyance direction of the recording medium and in a width direction orthogonal to the conveyance direction, the opening group includes a most upstream opening that is located on a most upstream side in the conveyance direction and a distance between the most upstream opening and the air circulation hole in the conveyance direction is smaller than the width of the ink passage in the conveyance direction.

3. The inkjet recording apparatus according to claim 1, wherein a plurality of the openings are spaced a predetermined distance from each other in a width direction, and a same number of the air circulation holes as the openings are spaced the predetermined distance from each other.

* * * * *